E. J. VON PEIN.
INDICATING MECHANISM FOR CASH REGISTERS.
APPLICATION FILED MAR. 27, 1915.

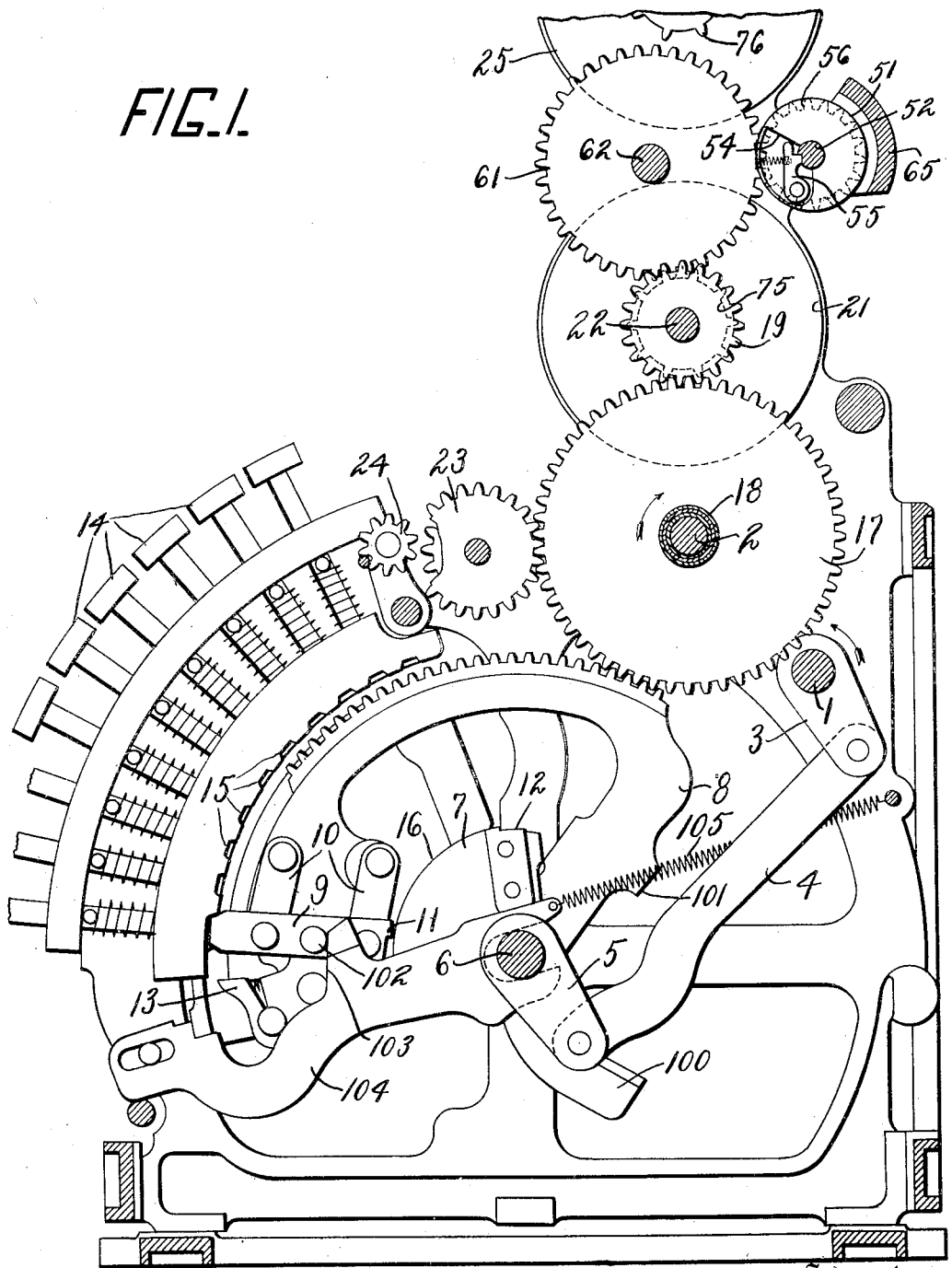

1,242,281.

Patented Oct. 9, 1917.
3 SHEETS—SHEET 2.

Inventor
Edward J. Von Pein
by R. C. Mass.
Carl Benst
Attorneys

E. J. VON PEIN.
INDICATING MECHANISM FOR CASH REGISTERS.
APPLICATION FILED MAR. 27, 1915.

1,242,281.

Patented Oct. 9, 1917.
3 SHEETS—SHEET 3.

Inventor
Edward J Von Pein.
by
Carl Beust
Attorneys

UNITED STATES PATENT OFFICE.

EDWARD J. VON PEIN, OF DAYTON, OHIO, ASSIGNOR TO THE NATIONAL CASH REGISTER COMPANY, OF DAYTON, OHIO, A CORPORATION OF OHIO, (INCORPORATED IN 1906.)

INDICATING MECHANISM FOR CASH-REGISTERS.

1,242,281.      Specification of Letters Patent.      Patented Oct. 9, 1917.

Application filed March 27, 1915. Serial No. 17,337.

*To all whom it may concern:*

Be it known that I, EDWARD J. VON PEIN, a citizen of the United States, residing at Dayton, in the county of Montgomery and State of Ohio, have invented certain new and useful Improvements in Indicating Mechanism for Cash-Registers, of which I declare the following to be a full, clear, and exact description.

This invention relates to improvements in cash registers, and has more particular relation to indicating mechanisms therefor.

In the accompanying drawings the improvements are shown applied to a machine of the type fully shown and described in Letters Patent of the United States, granted April 13, 1897, to J. P. Cleal and F. A. Reinhard, No. 580,378. This machine is only used, however, because it seems to serve best to illustrate the invention, but it is not the desire to be limited to this specific embodiment of the idea. The improvements are of such a nature that they may be applied in various modifications to many other kinds and principles of cash registers and accounting machines.

Cash registers as heretofore constructed have usually been provided with indicators arranged to display figures or other characters representing only the last transaction registered. These indicators are relied upon to compel correct entries in the accounting devices of the machine and after the correct entries have been made the right amount of money or its equivalent must, of course, be deposited in the receptacle provided for the purpose if the contents of the receptacle are to balance with the records made in the accounting devices. Such indicating mechanism is particularly valuable in connection with cash transactions, as a clerk ordinarily could not enter less than the correct amount and keep the difference without danger of detection. The indicators would clearly show to the customer and others familiar with the transaction just what had been done.

However, in busy places where registrations follow quickly one after the other one indication might be replaced by the next before a wrong registration could be detected or attention called to it. Or, a clerk might purposely destroy a wrong indication by operating the machine a second time under one pretext or another before the indicators could be read. Such a manipulation would be comparatively easy, especially if the machine was electrically operated.

Cash registers equipped with indicators are usually also provided with screens moved to a position where they conceal the indicators from view while the new indications are being set up. The screens are then withdrawn so that the indicators may be seen. In some of these machines the screens are moved to concealing position as soon as one of the keys or other manipulative devices controlling the operation is adjusted. This makes it possible for the operator quickly to conceal the indication, before it can be observed, by operating one of the keys or manipulative devices immediately after the completion of a registration. Such machines do not, of course, afford the proprietor a full measure of protection.

From the foregoing, it is apparent that if such machines instead of being equipped with indicators to display only the last transaction, were provided with indicators to show several consecutive transactions including the last, it would be practically impossible to manipulate the machine successfully as above suggested. It is hardly probable that an operator could perform such a manipulation enough times in succession to carry a false item clear of all of the sets of indicators without arousing suspicion. A main object of the invention is to provide such an indicating mechanism, that is, one indicating not only the last transaction but also several of the transactions immediately preceding the last.

Another object is to provide improved mechanism for transferring the reading of one set of accounting elements to another. While in the present embodiment the idea is applied to sets of indicators, it will be apparent when the invention is fully understood that it can be applied just as easily to other forms of accounting elements. It will also be apparent later that while the invention is in this instance shown in connection with three sets of indicators this number of sets is not essential. Any desired number of sets may readily be employed.

With these and incidental objects in view, the invention consists in certain novel features of construction and combinations of parts the essential elements of which are set forth in appended claims, and a preferred form of embodiment of which is hereinafter described with reference to the drawings which accompany and form part of this specification.

Of said drawings:—

Figure 1 is a section taken at the right of one of the rows of keys of a machine such as shown in the Cleal and Reinhard patent with the improved indicator mechanism applied thereto. In said figure part of the indicating mechanism is broken away at the top.

Figure 5:
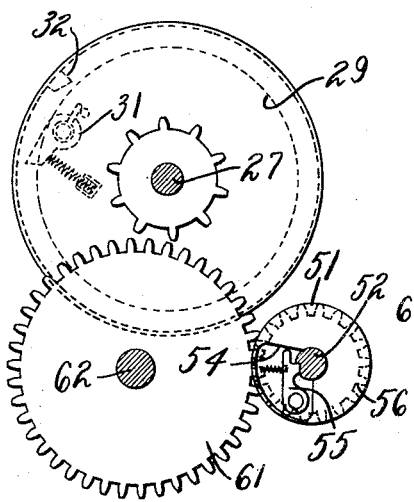
Fig. 5 is a detail of an indicator belonging to one of the upper sets and some of the devices for operating same.

The Cleal and Reinhard machine used to illustrate the invention has, as is well known, a plurality of rows of keys, an actuating member for each row, and a driving mechanism common to all of said members. When keys are depressed and the driving mechanism operated the actuating members are carried in one direction until stopped by the depressed keys and are then held in arrested position against movement during the rest of the operation. At the beginning of the next operation the actuating members are all restored to a normal starting point, and are then again carried by the driving mechanism into positions determined by the keys depressed as a preliminary to the second operation. Geared to each actuating member is an indicator bearing on its periphery characters to represent the various positions to which the actuating member may be adjusted. The construction is such that when the actuating members are moved to positions determined by depressed keys the indicators will be rotated to bring characters corresponding to said keys to a position where they may be seen and when the actuating members are returned to their normal starting points at the beginning of the next operation the indicators will be reversely rotated to their zero positions.

In addition to the set of indicators just mentioned the improved machine is equipped with two other sets extending across the machine parallel to the first and with the indicators of the same value in the three sets arranged in vertical alinement one above the other. All three sets are substantially the same so far as their arrangement and general appearance are concerned. At the end of an operation the lowest set of indicators, which is the one operated by the differential actuating members, will show the last item, the second from the bottom will show the next to the last item and the top set will show the second from the last item entered in the machine. At the next operation the item on the lowest set of indicators will be transferred to the second set, the item on the second set will be transferred to the third or top set and the item being entered by the operation will be set upon the first or lowest indicators. This occurs at each operation so that the items follow one another across the groups of indicators in regular order. The last three items entered and the order in which they were entered may, therefore, be quickly ascertained by inspection of the indicators.

At the beginning of each operation all three sets of indicators are cleared, the lowest set by the return to normal of the differential actuating members geared thereto and the other sets by invariably moved devices operated directly from the driving mechanism. Intermediate the first and second and the second and third sets of indicators are two series of devices upon which are set up the items removed from the first and second sets of indicators when they are cleared. The intermediate devices are then disconnected from the first and second sets of indicators and connected to the second and third sets respectively after which the intermediate devices are actuated to adjust the second and third sets to show the items previously appearing on the first and second sets. The construction and operation of the intermediate devices is such that the movement they receive when the indicators are cleared and the movement they have when actuating the next set of indicators are both in the same direction and the total of the two movements is always the same. That is to say, at each operation the intermediate devices are given two differential movements, one the complement of the other, and, as a result, the distance that a second indicator is driven by one of the intermediate devices is always a complement of the distance covered by the first indicator during its clearing movement.

As above pointed out, the illustrative machine has a plurality of rows of keys each row controlling the differential movements of an actuating member. One or more of these actuating members may simply operate indicators and type carriers to indicate and print clerk's designating characters or characters to represent special transactions as shown in said Cleal and Reinhard patent, while the other members in addition to operating the indicators and type carriers also actuate a totalizer, as also shown in said patent. One of the latter members and the keys for controlling it are shown in Fig. 1 of the accompanying drawings. The others are not shown for the reason that the .arious rows of keys and the devices controlled thereby are all substantially alike in construction and operation.

The driving mechanism which, as above stated, is common to all of the differential actuating members may be operated by means of either a motor or handle and comprises shafts 1 and 2 extending across the machine. Both of these shafts make a complete rotation at each operation in the direction indicated by the arrows. Fastened to the shaft 1 is a crank arm 3 connected by a link 4 to an arm 5 fastened to a shaft 6. Rigid on the shaft 6 is a series of segmental plates 7, there being one of said plates for each row of keys. The arm 3 is shorter than the arm 5 so that at each rotation of the shaft 1 the shaft 6 and the plates 7 thereon are simply oscillated through an arc of about 90 degrees first counter clockwise and then clockwise (Fig. 1). Pivoted on the rock shaft 6 and adjacent each of the plates 7 is one of the differential actuating members designated by the numeral 8. Each of these members has a plunger 9 loosely supported by links 10 pivotally attached at their upper ends to the actuating member. At its inner or rear end the plunger 9 is equipped with a shoulder 11 to coöperate with a cut 12 in the periphery of the segmental plate 7. If the parts are all in the positions shown in Fig. 1 and the machine is operated, the counter clockwise movement of the plate 7 will bring the cut 12 under the shoulder 11. A spring (not shown but well known in the type of machine illustrated) will then cause the plunger to move endwise to seat the shoulder 11 in the cut. At the same instant an arm 100 carried by the plate 7 will engage the member 8 at 101, and, owing to the connection thus formed, the operating member 8 and the plate 7 will move as a unit. During the clockwise movement of the latter a trip 13 operatively connected to the plunger 9 strikes the inner end of any key 14 that may be depressed. When said trip strikes the key the plunger is projected forward, thereby disengaging the shoulder 11 from the cut 12 and engaging the forward end of the plunger with the one of the notches 15 corresponding to the key operated in a stationary frame plate. The plunger is held in engagement with said notch during the rest of the operation by the shoulder 11 riding on the periphery 16 of the plate 7.

When at the beginning of the next operation the plate 7 is moved counter clockwise the cut 12 will again be brought under the shoulder 11 and the spring above mentioned but which is not shown will again move the plunger 9 to withdraw it from engagement with the notch 15 and engage the shoulder 11 with the cut 12 and the arm 100 will engage the member 8 at 101. The plate 7 and operating member 8 then move as a unit during the rest of the counter clockwise movement of the former until the operating member is restored to its normal starting point. If no key in the row has been depressed the operating member will be retained at said normal starting point by a zero stop not shown in the drawings and by the pin 102 carried by the plunger 9 engaging, and being forced forward by the beveled upper end of an extension 103 of a plate 104. The plate 104 forms no part of the present invention and is fully described and shown in said Cleal and Reinhard patent. It is sufficient for the present purpose to state that whenever a key 14 is depressed the plate 104 is released and drawn rearwardly by a spring 105 thus carrying the extension 103 away from the pin 102. If a key has been depressed, however, said zero stop will also have been disabled and the shoulder 11 will remain in engagement with the cut 12 so that the plate 7 and operating member 8 will again move as a unit in a clockwise direction until the trip 13 strikes the depressed key.

Meshing with the teeth of the operating members 8 are gears 17 secured to sleeves 18 concentric to the driving shaft 2. These sleeves are used to operate type carriers. Said type carriers and the other printing devices are not shown in the accompanying drawings, but it is to be understood that the machine is in this respect substantially the same as the one shown and described in the above mentioned patent. Meshing with the gears 17 are pinions 19, rigid with indicators 21 rotatably mounted on a rod 22 extending across the machine. The gears 17 are also constantly in engagement with gears 23 of the totalizer. It is clear, therefore, that movement of the operating member 8 in either direction will effect corresponding rotation of the indicators 21 and the totalizer gears 23. As a result when the actuating member 8 is moved clockwise to position it with reference to a depressed key, the indicator is turned to position to display a character representing that key and when the actuating member is returned to its starting point at the beginning of the next operation the indicator is reversely rotated to zero. The totalizer gears 23 have the same movements as the indicators, but a broad toothed pinion 24 is operated to connect said gears and the totalizer proper during the clockwise movement only of the actuating members so that the adding elements of the totalizer are rotated differential extents in a constant direction by successive operations of the actuating members 8.

The mechanism, as described so far, is all well known in the art and is fully shown and described in the Cleal and Reinhard patent above mentioned.

Figure 3:
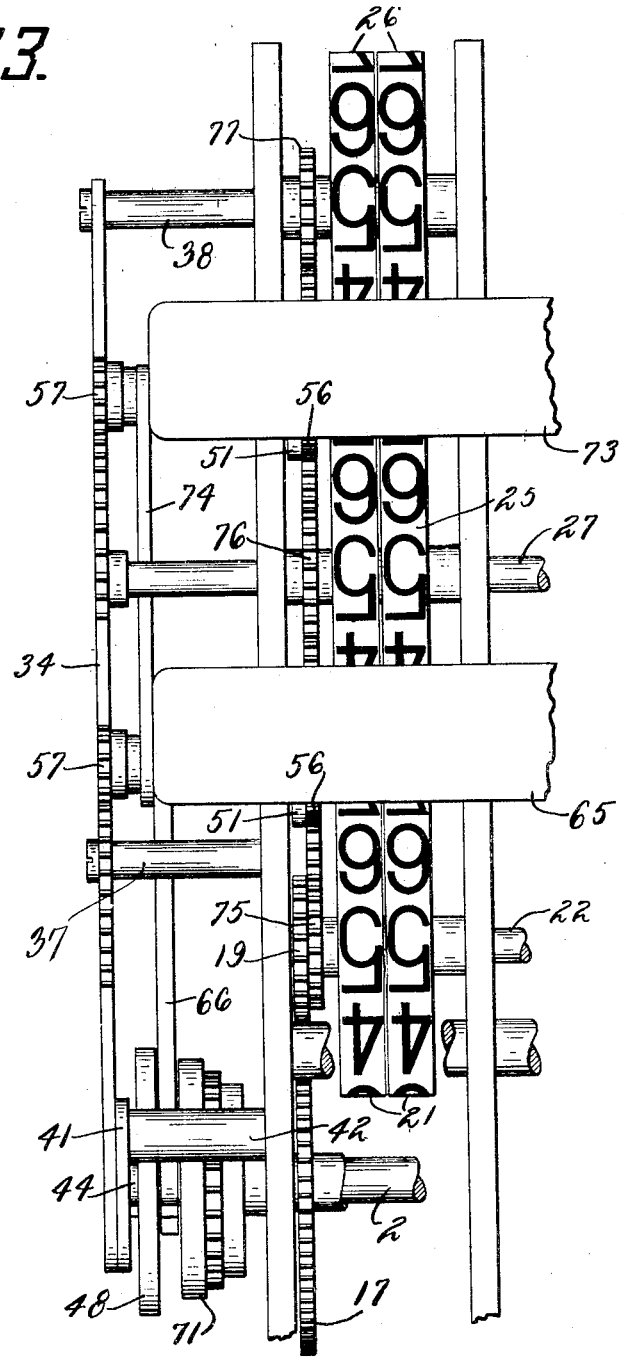
Fig. 3 shows in rear elevation two of the indicators of each set and certain of the devices for operating them.

The two additional sets of indicators 25 and 26 comprised by the present embodiment of the invention are loosely mounted on shafts 27 and 28 journaled in the frames of the machine. For each indicator of the two sets there is provided a disk 29 (Fig. 5). These disks, which are fastened to the shafts 27 and 28, are within the peripheries of the indicators and carry spring pressed pawls 31 to coöperate with lugs 32 fastened to the insides of the indicators. Secured to the right hand ends of the shafts 27 and 28 are pinions 33 meshing with rack teeth formed in the forward edge of a bar 34. Slots 35 and 36 in said bar surround screws in the ends of studs 37 and 38 (Fig. 3) fastened to the adjacent machine frame, thereby permitting a sliding vertical movement of the bar. At its lower end the bar 34 carries an antifriction roller 39 projecting laterally into a slot 40 in one arm of a bell crank 41. Said bell crank is pivoted on a stud 42 fastened on the machine frame and is loosely connected at 43 to the rear end of a pitman 44. The pitman 44 is slotted at 45 to surround the driving shaft 2 and carries at its forward end an antifriction roller 46 projecting into a cam groove 47 formed in the side of a disk 48 rigid with the driving shaft 2. The shaft 2, it will be recalled, makes a complete rotation at each operation of the machine. The shape of the cam groove 47 is such that at the beginning of each rotation of the shaft 2 the pitman 44 is drawn forward, thereby swinging the bell crank 41 about its pivot 42 and raising the rack bar 34 far enough to drive the shafts 27 and 28 approximately nine-tenths of a complete rotation in an anti-clockwise direction. The rack bar is held elevated for a short period and is then returned to its original position, causing a reverse or clockwise rotation of the shafts 27 and 28 to their starting points. During the anti-clockwise rotation of the shafts, that is, just after an operation is commenced, the pawls 31 on the disks 29 engage the lugs 32 of any indicators that may have been rotated a step or more from their normal positions during the preceding operation and turn said indicators the rest of a complete rotation to the position where they will show their zeros. In Fig. 5, one of the indicators is shown at zero, with the pawl bearing disk 31 therefor at its normal starting point. When the indicator is in this position it is clear that the first or counter clockwise movement of the disk 29 on account of said movement being only nine-tenths of a rotation will not cause the pawl 31 to engage the lug 32 and the indicator will not be disturbed. If, however, the indicator had been moved a step or more in a counter clockwise direction during the preceding operation of the machine the lug 32 would have been carried past the end of the pawl 31.

Then during the counter clockwise rotation of the disk 29 the pawl 31 would engage the lug and carry the indicator the rest of the complete rotation, that is, to its zero position.

During the time that the two top sets of indicators 25 and 26 are being turned forward to zero as described, the lowest set 21 is being reset to zero by the counter clockwise movement of the actuating members 8 so that early in each operation all three sets of indicators will have been cleared.

The intermediate devices hereinbefore mentioned comprise two series of disks 51 loose on shafts 52 journaled in lugs 53 projecting rearwardly from the machine frames. Each of said disks is cut out as at 54 (Fig. 5) and in these cut out portions are pawls 55 pivoted to the sides of gears 56 fastened to the sides of the disks 51. Springs constantly press said pawls 55 into contact with the shafts 52. Both of said shafts have longitudinal grooves with one side squared to coöperate with shoulders on the pawls. Fastened to the right hand ends of the shafts 52 are pinions 57 engaging rack teeth formed in the rear edge of the sliding bar 34. When said bar is raised at the beginning of an operation the pinions 57 and shafts 52 are given nine-tenths of a rotation in a clockwise direction and when the bar is lowered to its original position said pinions and shafts will be reversely rotated to their starting point. During this reverse rotation the squared side of the grooves in the shafts will engage the shoulders of the pawls carried by any disks 51 that may have been turned a step or more anti-clockwise (Fig. 5) from the normal position and carry the disks the rest of a complete rotation. If a disk has not been turned away from the normal or zero position, the nine-tenths of a rotation of the shaft 52 clockwise will not carry the square side of the groove far enough to engage the pawl on the disk when the shaft is rotated anti-clockwise to its original position and the disk will remain undisturbed at its starting point. Movement of the disks 51 to positions where they will be picked up by the shafts 52 is effected as hereinafter described by the clearing of the indicators.

Figure 4:
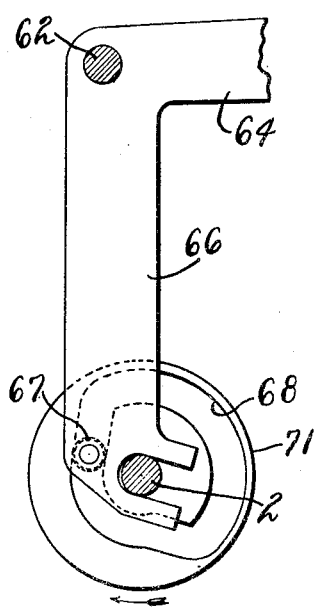
Fig. 4 is a detail of one of the cams for connecting and disconnecting mechanism intermediate the sets of indicators.
Figure 2:
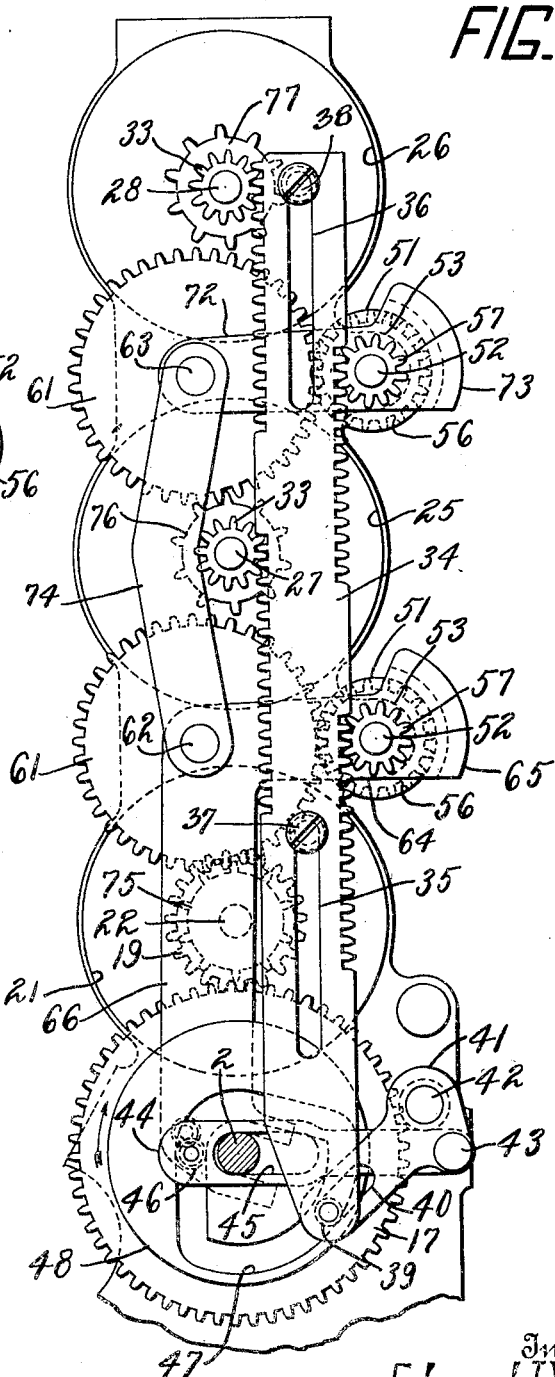
Fig. 2 is a right side elevation of the improved indicating mechanism.

The gears 56 of the intermediate devices are at all times in mesh with gears 61 rotatably mounted on rods 62 and 63. The rod 62 is supported at its ends by arms 64 of a yoke shaped frame 65 extending across the rear of the machine and journaled on the lower shaft 52. A downwardly extending portion 66 of each of the arms 64 is provided with a slot to engage with and be guided by the shaft 2. Each of these downwardly extending portions is provided with an antifriction roller 67 engaging a cam groove 68 (Fig. 4) in a disk 71 fastened to the driving shaft 2. The other rod, that is, rod 63 is mounted in the arms 72 of a similar yoke frame 73 journaled on the upper shaft 52. At their forward ends the arms 72 are supported by links 74 pivoted at one end on the rod 62 and at the other on the rod 63. The cam grooves 68 are so formed that during the early part of an operation, that is, while the sets of indicators are being cleared, the gears 61 are held in engagement with gears 75 and 76 rigid with the first and second sets of indicators so that the clearing movement of said indicators is transmitted to the disks 51. This causes the items appearing on the first and second sets of indicators at the beginning of the operation to be set up on said disks. The cam grooves 68 then rock the yoke frames 65 and 73 about the shafts 52 to lift the gears 61 out of engagement with the gears 75 and 76 and into engagement respectively with the gears 76 of the second set of indicators and gears 77 rigid with the top set of indicators, after which the shafts 52 are rotated reversely or anti-clockwise as before described. During this reverse rotation the squared sides of the grooves in the shafts engage the pawls carried by the disks 51, thereby picking up said disks at the positions to which they were just differentially adjusted by the clearing of the next lower indicators and carrying the disks the rest of a complete rotation. This second or complementary movement of the disks is, because of the connection just established, transmitted through the gears 56 and 61 to the second and third sets of indicators. The arrangement of the parts is such that the complementary movement of the disks 51 rotates the indicators of the second and third sets from their zeros back through the nines to bring to indicating position the characters corresponding to the ones which appeared on the next lower sets at the beginning of the operation. During the time that the second and third sets are being adjusted in this way, the first or lowest set is being adjusted by the operating members 8 to set up the item being entered by the operation of the machine, so that when the operation is completed the last three items entered will appear on the indicators, the last item on the lowest set, the next to the last item on the middle set and the second from the last item on the top set of indicators.

While, as stated in the immediately preceding paragraph, the second and third sets of indicators are turned from zero back through the nines to bring the desired characters to indicating position the complementary clearing movement of the indicators will set the second intermediate disks 51 according to the values indicated and not according to the setting up movement of the indicators. For example, if one of the second indicators 25 is to show the digit "7" the indicator will be turned back three steps from zero to bring the "7" to the indicating position. When the indicator is cleared it is turned in the same direction as before, so it will be moved seven steps before it reaches the zero position. During this clearing movement the disk 51 intermediate the second and third indicators is operatively connected to the former so that the disk will be rotated seven steps. On the other hand, the clearing movement of the first indicators 21 is always the same in extent but in a direction opposite to the setting up movement. It is apparent, therefore, that the values on the indicators are set up on both sets of intermediate devices as a preliminary to operation of said devices to adjust the next higher indicators.

When describing the operation of the actuating members 8 it was stated that devices (not shown) are provided whereby if the machine is operated with no key depressed in a bank the actuating member for that bank will be held at zero during the rest of that operation. These devices will continue to hold the actuating member stationary at the starting point during all succeeding operations which do not require the use of a key in that bank. It is apparent, however, that if a value has once been set up on the first intermediate disk 51 by the restoring movement of the actuating member 8 said value will be carried across the second and third indicators by successive operations of the driving mechanism even though the actuating member does remain stationary at its normal position.

In order to summarize the operation of the improved machine to the best advantage, a brief statement will be made as to just what happens when the values three, five and eight are entered in the machine by means of a single row of keys and at successive operations of the driving mechanism. In making this statement, it will be assumed that the indicators associated with the row of keys have been cleared by preceding successive operations in which none of the keys in the row were depressed.

At the beginning of the first operation the "3" key is pressed in, this being the third key from the bottom of the row (Fig. 1) and the driving mechanism is then operated. This will cause the actuating member 8 to be raised three steps from the position in which it is shown or until stopped by the three key and the indicator 21 will be rotated a corresponding distance to display its digit 3.

The five key is then depressed and the machine again operated. Among the things that happen first, the actuating member 8 will be restored three steps to its starting point, rotating the indicator 21 back to zero and through the transmitting gear 61 turning the intermediate disk 51 three steps from normal. During the same time the shaft 52 is rotated clockwise approximately nine-tenths of a complete rotation. Continued operation of the machine adjusts the actuating member 8 and indicator 21 five steps to display the digit 5 on the latter to represent the key operated and also effects anti-clockwise rotation of the shaft 52 so that the square sided groove therein will engage the pawl carried by the lower disk 51 and rotate the disk the rest of the way or seven steps to its starting point. Just before this seven steps of movement of the disk begins, however, the transmitting gear 61 is disengaged from the first indicator and engaged with the second so that the seven steps of movement of the disk 51 rotates the second indicator backward seven steps from zero to the position where its digit 3 may be seen.

At the beginning of the third operation, that is, the one to register eight, the eight key is depressed and the driving mechanism started as before. Early in the operation the differential actuating member 8 is restored five steps from the position at which it was left by the preceding operation, resetting the indicator 21 to zero and imparting five steps of movement to the first disk 51. During the restoring movement of the member 8 the second indicator, which it will be recalled, was left in position to display its digit 3, will be given three steps of movement to zero by its disk 29. This movement is transmitted through the upper gear 61 to the upper intermediate disk 51. It is clear, therefore, that at this stage in the third operation all three sets of indicators will be at zero, the actuating member 8 will be at its starting point with the eight key depressed, the lower disk 51 will have been turned five steps from normal and the upper disk 51 will have been turned three steps from normal. Further operation of the driving mechanism will disengage the transmitting gears 61 from the first and second indicators and engage them with the second and third indicators. The actuating member 8 will now move eight steps until stopped by the eight key, the lower disk 51 will be advanced five steps or the rest of a complete rotation, while the upper disk 51 will travel seven steps before it reaches its starting point. The eight steps of movement of the actuating member 8 will turn the indicator 21 a corresponding distance to display the digit 8, the five steps of movement of the lower disk 51 will turn the second indicator from zero back through nine to the digit "5" and the seven steps of movement of the upper disk 51 will turn the top indicator from zero back to 3. It is clear, therefore, that at the end of the third operation the lowest indicator will show "8" to indicate the last item, the middle indicator will show "5" indicating the next to the last item and the top indicator will show the "3" representing the second from the last item entered by the three successive operations of the machine.

While the form of mechanism here shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:—

1. In a machine of the class described, the combination with an accounting device, of mechanism for entering items in said accounting device, digit carriers, and means actuated by the item entering mechanism for setting the digit carriers to represent at the end of an operation a plurality of separate items entered by previous operations of said mechanism.

2. In a machine of the class described, the combination with an accounting device, of mechanism for entering items in said accounting device, digit carriers, and means operated by the item entering mechanism for setting the digit carriers to represent a plurality of separate successive items entered in the accounting device.

3. In a machine of the class described, the combination with an accounting device, of mechanism for entering items in said accounting device, digit carriers, and means operated by the item entering mechanism for setting the digit carriers to show at each operation a plurality of successive items entered in the accounting device and the order in which they were entered.

4. In a machine of the class described, the combination with a totalizer, of mechanism for entering items in said totalizer, digit carriers, and means operated by the item entering mechanism for setting up on the digit carriers at each operation a plurality of successive items which have been entered in the totalizer.

5. In a machine of the class described, the combination with a totalizer, of mechanism for entering items in said totalizer, digit carriers, and means operated by the item entering mechanism for setting the digit carriers to show at each operation a plurality of items entered in the totalizer and the order in which they were entered.

6. In a machine of the class described, the combination with a plurality of series of digit carriers, of manipulative devices, differential mechanism controlled by the manipulative devices for setting up items on one series of digit carriers, and means for automatically transferring items so set up from series to series of the carriers at successive operations of the differential mechanism.

7. In a machine of the class described, the combination with a plurality of sets of digit carriers, of differential mechanism connected to set up items on one set of digit carriers, driving mechanism for the differential mechanism, and means controlled by the differential mechanism for automatically transferring items from set to set of the digit carriers at successive operations of the driving mechanism.

8. In a machine of the class described, the combination with an accounting device, of mechanism for entering items therein, indicators, and means actuated by the item entering mechanism for setting the indicators to show in itemized form a plurality of items entered by previous operations of said mechanism.

9. In a machine of the class described, the combination with an accounting device, of mechanism for entering items therein, indicators, and means operated by the item entering mechanism for setting the indicators to show in itemized form a series of successive items entered in the accounting device.

10. In a machine of the class described, the combination with an accounting device, of mechanism for entering items in the accounting device, indicators, and means operated by the item entering mechanism for setting the indicators to show a series of successive items entered in the accounting device and the order in which they were entered.

11. In a machine of the class described, the combination with a totalizer, of mechanism for entering items on the totalizer, indicators, and means operated by the item entering mechanism for setting the indicators to show a series of successive items entered in the totalizer.

12. In a machine of the class described, the combination with a totalizer, of mechanism for entering items in the totalizer, indicators, and means operated by the item entering mechanism for setting the indicators to show a series of successive items entered in the totalizer and the order in which they were entered.

13. In a machine of the class described, the combination with an accounting device, of mechanism for entering items in said device, a plurality of sets of indicators, connections whereby operation of the item entering mechanism to enter an item in the accounting device will operate one set of indicators to indicate the item, and means for transferring said items from set to set of the indicators at successive operations of the item entering mechanism.

14. In a machine of the class described, the combination with a totalizer, of mechanism for entering items on the totalizer, a plurality of sets of indicators, connections whereby operation of the item entering mechanism to enter an item on the totalizer will position one set of indicators to indicate the item, and means for transferring said item from set to set of the indicators at successive operations of the item entering mechanism.

15. In a machine of the class described, the combination with an accounting device, of mechanism for entering items in said device, a plurality of sets of indicators, connections whereby operation of the item entering mechanism to enter an item in the accounting device will operate one set of indicators to indicate the item, and means for transferring said item from set to set of the indicators in an invariable sequence at successive operations of the item entering mechanism.

16. In a machine of the class described, the combination with a totalizer, of mechanism for operating same, a plurality of sets of indicators, connections whereby an operation of the operating mechanism will adjust one set of indicators to indicate the item entered at said operation, and means for transferring said item from set to set of indicators in an invariable sequence at successive operations of the operating mechanism.

17. In a machine of the class described, the combination with a main driving mechanism, of an accounting device, differential mechanism driven by the driving mechanism for operating the accounting device, a plurality of sets of indicators, means connected to the differential mechanism for operating one set of indicators to indicate an item as an incident to entering the item in the accounting device, and means for transferring each item from set to set of the indicators by subsequent operations of the driving mechanism.

18. In a machine of the class described, the combination with a driving mechanism, of a totalizer, differential mechanism driven by the driving mechanism for operating the totalizer, a plurality of sets of indicators, means connected to the differential mechanism for operating one set of indicators to indicate each item as an incident to entering the item on the totalizer, and means for transferring each item from set to set of these indicators by subsequent operations of the driving mechanism.

19. In a machine of the class described, the combination with a totalizer, of mechanism for entering items in the totalizer, a plurality of sets of digit carriers, and means for setting up the same item on a different set of digit carriers at each succeeding operation of the item entering mechanism.

20. In a machine of the class described, the combination with a totalizer, of mechanism for entering items in the totalizer, a plurality of sets of indicators and means for displaying the same item on a different set of indicators at each succeeding operation of the item entering mechanism.

21. In a machine of the class described, the combination with a totalizer, of operating mechanism therefor, a plurality of sets of accounting elements, and means actuated by the operating mechanism for positioning said accounting elements to show at the end of an operation a plurality of successive items including the last one entered in the totalizer.

22. In a machine of the class described, the combination with an accounting device, of operating mechanism therefor, a plurality of sets of indicators, and means actuated by the operating mechanism for operating the indicators to show in itemized form at the end of an operation a plurality of successive items including the last one entered in the accounting device.

23. In a machine of the class described, the combination with an accounting device, of mechanism for entering items in the accounting device, a plurality of sets of indicators, each set to show one of a series of consecutive items entered in the accounting device, and means for automatically transferring the items from set to set of the indicators at successive operations of the item entering mechanism.

24. In a machine of the class described, the combination with a totalizer, of mechanism for entering items on the totalizer, a plurality of sets of indicators, each set to show one of a series of consecutive items entered in the totalizer, and means for transferring the items from set to set of the indicators at succeeding operations of the item entering mechanism.

25. In a machine of the class described, the combination with a totalizer, of differential mechanism for entering items on the totalizer, a plurality of sets of indicators, each set to indicate one of a plurality of successive items entered, connections whereby entering an item on the totalizer will operate one set of indicators to display the item, devices intermediate said set of indicators and the next set, means for transferring the amount on the first set of indicators to said intermediate devices as a preliminary to setting up a second item on the first indicator, and means for then operating the intermediate devices to set up the first item on the second set of indicators.

26. In a machine of the class described, the combination with an accounting device, of an operating mechanism therefor, indicators operatively connected to said mechanism for separately indicating a series of consecutive items entered in the accounting device, means for clearing the indicators at each operation, devices intermediate the sets of indicators constructed to receive the amounts on the indicators when the indicators are cleared and then set up the amounts on the next sets of indicators, and means for operating said devices.

27. In a machine of the class described, the combination with a totalizer, of an operating mechanism therefor, indicators operatively connected to said mechanism for separately indicating a series of consecutive items entered in the totalizer, means for clearing the indicators at each operation, devices intermediate the sets of indicators constructed to receive the amounts on the indicators when the indicators are cleared and then set up the amounts on the next sets of indicators, and means for operating said devices.

28. In a machine of the class described, the combination with a plurality of sets of indicators, of differential mechanism for setting up items on one of the sets, and means for automatically operating the other sets to indicate a plurality of items set up by previous operations of the differential mechanism.

29. In a machine of the class described, the combination with a plurality of sets of indicators, of differential mechanism for setting up items on one of the sets, and means controlled by the differential mechanism for automatically operating the other sets to indicate a plurality of items set up by previous operations of the differential mechanism and the order in which they were set up.

30. In a machine of the class described, the combination with a plurality of sets of indicators, of differential mechanism for setting up items on one of the sets, driving devices for the differential mechanism, and means for automatically transferring items from set to set of the indicators by successive operations of the driving mechanism.

31. In a machine of the class described, the combination with a plurality of sets of indicators, of differential devices for setting up items on one of the sets, a driving mechanism common to the differential devices, and means for transferring items from set to set of the indicators in an invariable sequence by operations of the driving mechanism.

32. In a machine of the class described, the combination with a plurality of sets of indicators, of differential mechanism for setting up items on one set, and mechanism for transferring an item from one set to another as an incident to setting up an item on one of the sets.

33. In a machine of the class described, the combination with a plurality of sets of indicators to indicate a series of successive transactions and their order in the series, of differential mechanism for setting up items on one set, and mechanism for transferring an item from one set to another as an incident to setting up an item on one of the sets.

34. In a machine of the class described, the combination with a plurality of sets of indicators, of key controlled differential mechanism for setting up items on one set, and mechanism for transferring an item from one set to another as an incident to setting up an item on one of the sets.

35. In a machine of the class described, the combination with a plurality of sets of indicators, of manipulatively controlled differential mechanism for setting up items on one set, and mechanism for transferring an item from one set to another as an incident to setting up an item on one of the sets.

36. In a machine of the class described, the combination with a plurality of sets of indicators, of manipulatively controlled differential mechanism for setting items on one set, and mechanism independent of the differential mechanism for transferring items automatically from one set to another.

37. In a machine of the class described, the combination with a plurality of sets of accounting elements, of means for setting up items on said elements and clearing them, devices intermediate the sets of elements, means connecting one set of elements with the intermediate devices during the clearing of the elements whereby clearing movement of the elements will differentially position said devices, means for moving the connecting means to disconnect the first elements from the intermediate devices and connect said devices to the second elements, and means for then differentially actuating the intermediate devices to adjust the second elements.

38. In a machine of the class described, the combination with a plurality of sets of indicators, of means for clearing the indicators, devices intermediate the sets of indicators, means normally connecting one set of indicators with the intermediate devices during the clearing of the indicators whereby the clearing movement of the indicators will differentially position said devices, means for moving the connecting means to disconnect the first indicators and the intermediate devices and connect said devices to the second indicators, and means for then differentially actuating the intermediate devices to adjust the second indicators.

39. In a machine of the class described, the combination with a plurality of sets of accounting elements, of means for setting up items on said elements and clearing them, devices intermediate the sets of elements, means normally connecting one set of elements with the intermediate devices during the clearing of the elements whereby the clearing movement of the elements will differentially position said devices, means for moving the connecting means to disconnect the first elements and the intermediate devices and connect said devices with the second elements, and means for then imparting a complementary movement to the intermediate devices whereby to adjust the second elements to represent the value appearing on the first elements at the beginning of the operation.

40. In a machine of the class described, the combination with two sets of indicators of means for differentially adjusting the indicators to set up items, means for imparting a complementary differential movement to one set of indicators whereby to clear the indicators, devices intermediate the sets of indicators, means normally connecting the intermediate devices and the one set of indicators during the complementary clearing movement of the indicators whereby to differentially adjust said devices, means for moving the connecting means to disconnect the first indicators from the intermediate devices and connect them to the second indicators, and means for imparting a complementary movement to said intermediate devices whereby to adjust the second indicators to display the item appearing on the first indicators at the beginning of the operation.

41. In a machine of the class described, the combination with entry retaining devices, of mechanism for entering items in said devices, item indicators, and means operatively connected to the item entering mechanism for setting said indicators to indicate in itemized form a plurality of successive items.

42. In a machine of the class described, the combination with differential devices, of manipulative devices, means controlled by the manipulative devices for operating the differential devices, indicators, and means for automatically setting the indicators to indicate in itemized form a plurality of operations of the differential devices.

43. In a machine of the class described, the combination with differential devices, of manipulative devices, means controlled by the manipulative devices for operating the differential devices, a plurality of sets of indicators, and means for automatically setting the sets of indicators to indicate in itemized form the extents of the operations of the differential devices during each of a plurality of operations of said differential devices.

44. In a machine of the class described, the combination with differential devices, of a keyboard comprising value keys, means controlled by said value keys for operating the differential devices, a plurality of sets of indicators, and means operatively connected to the differential devices for setting the indicators to indicate the keys employed in each of a plurality of successive operations of said devices.

45. In a machine of the class described, the combination with a plurality of sets of item indicators, of means for rotating one set of said indicators in one direction to set up items and reversely rotating them to remove the items, devices intermediate said one set of indicators and the next set of indicators and normally engaged with said one set, means whereby as the one set of indicators is cleared by reverse rotation the intermediate devices will be rotated a corresponding distance, means for moving said intermediate devices from engagement with the first set of indicators and into engagement with the second set of indicators, and means for then turning the intermediate devices to complete their rotation, whereby to transmit to the second set of indicators a movement complementary to the movement of the first set of indicators.

In testimony whereof I affix my signature in the presence of two witnesses.

EDWARD J. VON PEIN.

Witnesses:
F. E. HAMILTON,
A. A. WINTERS.